(12) United States Patent
Ulrich et al.

(10) Patent No.: US 7,823,132 B2
(45) Date of Patent: Oct. 26, 2010

(54) AUTOMATED TEST CASE VERIFICATION THAT IS LOOSELY COUPLED WITH RESPECT TO AUTOMATED TEST CASE EXECUTION

(75) Inventors: Adam M. Ulrich, Kent, WA (US); Michael D. Gallacher, Bothell, WA (US); Michael J. Hunter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1084 days.

(21) Appl. No.: 10/953,437

(22) Filed: Sep. 29, 2004

(65) Prior Publication Data

US 2006/0075303 A1    Apr. 6, 2006

(51) Int. Cl.
G06F 9/44 (2006.01)
G06F 11/00 (2006.01)

(52) U.S. Cl. .......................... 717/126; 714/38
(58) Field of Classification Search .................. None
See application file for complete search history.

(56) References Cited

U.S. PATENT DOCUMENTS

| | | | | |
|---|---|---|---|---|
| 4,696,003 A * | 9/1987 | Kerr et al. | | 714/38 |
| 5,157,782 A * | 10/1992 | Tuttle et al. | | 714/45 |
| 5,335,342 A * | 8/1994 | Pope et al. | | 714/38 |
| 5,513,315 A | 4/1996 | Tierney et al. | | |
| 5,600,789 A * | 2/1997 | Parker et al. | | 714/38 |
| 5,634,098 A * | 5/1997 | Janniro et al. | | 714/38 |
| 5,781,720 A | 7/1998 | Parker et al. | | |
| 5,881,237 A * | 3/1999 | Schwaller et al. | | 709/224 |
| 6,023,580 A | 2/2000 | Sifter | | |
| 6,067,639 A | 5/2000 | Rodrigues et al. | | |
| 6,236,993 B1 * | 5/2001 | Fanberg | | 707/6 |
| 6,449,744 B1 | 9/2002 | Hansen | | |
| 6,505,324 B1 | 1/2003 | Cowan et al. | | |
| 6,941,546 B2 | 9/2005 | Apuzzo et al. | | |
| 6,986,125 B2 | 1/2006 | Apuzzo et al. | | |
| 7,117,411 B2 | 10/2006 | McNeely et al. | | |
| 7,159,021 B2 | 1/2007 | Boldman et al. | | |
| 7,165,191 B1 * | 1/2007 | Vakrat | | 714/38 |
| 7,398,514 B2 | 7/2008 | Ulrich et al. | | |
| 7,457,989 B2 | 11/2008 | Ulrich et al. | | |
| 2003/0070120 A1 | 4/2003 | Michael et al. | | 714/38 |

(Continued)

FOREIGN PATENT DOCUMENTS

WO    WO 03/038550 A2    5/2003

OTHER PUBLICATIONS

Allott, S.K., "Automate Your Tests-You Won't Regress It!", *Seventeenth Annual Pacific Northwest Software Quality Conference*, Oct. 12-13, 1999, 135-157.

(Continued)

*Primary Examiner*—Michael J Yigdall
*Assistant Examiner*—Evral Bodden
(74) *Attorney, Agent, or Firm*—Woodcock Washburn LLP

(57) ABSTRACT

A system and method for verifying the systemic results of an action applied to an application and for providing the expected state of the application at any time or on demand, in which a verification manager determines an expected application state and a current application state of the application, a test case in communication with the verification manager executes the action, and the verification manager compares the expected application state and the current application state.

33 Claims, 5 Drawing Sheets

U.S. PATENT DOCUMENTS

| | | | |
|---|---|---|---|
| 2003/0084429 | A1 | 5/2003 | Schaefer |
| 2003/0131290 | A1 | 7/2003 | Weinberg et al. |
| 2003/0164854 | A1 | 9/2003 | Polk |
| 2003/0229825 | A1 | 12/2003 | Barry et al. |
| 2004/0088062 | A1* | 5/2004 | Minamimoto ................ 700/94 |
| 2004/0128652 | A1* | 7/2004 | Mandava et al. ............ 717/124 |
| 2004/0133881 | A1 | 7/2004 | Chamberlain et al. |
| 2005/0286742 | A1* | 12/2005 | Rasmussen et al. ......... 382/112 |

OTHER PUBLICATIONS

Chang, L. et al., "Using Application States in Software Testing", *International Conference on Software Engineering*, 2000, 776.

Dooley, .W., "Test Automation, A Cost Effective and Reliable Alternative to Labor", *Proceedings of the Technical Program, SMTA International*, Sep. 30-Oct. 4, 2001, 105-108.

Fecko, M.A. et al., "Lessons Learned from Automating Tests for an Operations Support System", *Software-Practice and Experience*, 2002, 32, 1485-1506.

Gascoyne, S., "Productivity Improvements in Software Testing with Test Automation", *Electronic Engineering*, 2000, 65-66.

Giaccone, F. et al., "Test and Debug of Device/Process Control Code", *IBM Technical Disclosure Bulletin*, 1976, 609-611.

Hirt, E., "Protest", *Proceedings of the 4th Conference on Quality Engineering in Software Technology and VDE-ITG Workshop on Testing Non-Functional Software-Requirements*, Sep. 13-15, 2000, Nuremberg, Germany, 278-289.

Martin, C.E. et al., "Test Development and Test Automation for the PacketStar® PSAX Product", *Bell Labs Technical Journal*, 2002, 7(1), 183-195.

Magalhaes, G.R. et al., "A tool for Test Automation with Support for Remote Tests", *Midwest Symposium on Circuits & Systems*, 2000, 343-346.

Pfifferling, F., "Test Automation: Benefits and Pitfalls", *IEEE Intercon Technical Program Papers*, 1973, 7(8), 3 pages.

Sabbatini, E. et al., "Automating Test by Adding Formal Specification: An Experience for Database Bound Applications", *Advances in Engineering Software*, 1999, 30, 885-890.

EP Application No. 05108366: European Search Report, Nov. 20, 2009.

Memon, "A Comprehensive Framework for Testing Graphical User Interfaces", Ph.D. dissertation, Jul. 26, 2001, 1-139.

Kung et al., "Developing an Object-Oriented Software Testing and Maintenance Environment", Communications of the ACM, Oct. 1995, 38(10), 75-86.

Torre et al., "Model Generation of Test Logic for Macrocell Based Designs", European Design Automation Conference, Proceedings of the conference on European design automation, Geneva, Switzerland, (no month available) 1996, 1-6.

U.S. Appl. No. 10/953,238: Non Final Rejection, Mar. 24, 2008, 26 pages.

U.S. Appl. No. 10/953,238: Notice of Allowance, Aug. 20, 2008, 6 pages.

U.S. Appl. No. 10/953,402: Final Rejection, Nov. 16, 2007, 17 pages.

U.S. Appl. No. 10/953,402: Non Final Rejection, Jul. 31, 2007, 18 pages.

U.S. Appl. No. 10/953,402: Notice of Allowance, Apr. 7, 2008, 18 pages.

* cited by examiner

AUTOMATED TEST CASE VERIFICATION THAT IS LOOSELY COUPLED WITH RESPECT TO AUTOMATED TEST CASE EXECUTION

CROSS-REFERENCE TO RELATED APPLICATIONS

This application is related to U.S. patent application Ser. No. 10/953,238, entitled "System and Method for Selecting Test Case Execution Behaviors for Reproducible Test Automation," filed herewith on Sep. 29, 2004 and U.S. patent application Ser. No. 10/953,402, entitled "Test Automation Stack Layering," filed herewith on Sep. 29, 2004.

FIELD OF THE INVENTION

The invention relates to software for testing applications and in particular to a loosely coupled comparison of expected and actual results in such testing software.

BACKGROUND OF THE INVENTION

The major stages in the life cycle of software development are the design phase, the coding phase, the code complete phase, the alpha phase, the beta phase, and finally, release to market. During the design phase, the customer problems the software product will address and the functionality of the software product is defined. Typically, the completion of the functional specification marks the end of the design phase. The coding phase may already have begun. The code complete phase is reached when the code has been written but is not necessarily debugged. The alpha phase marks the point in time when the product is stable; that is, most of the major bugs have been found. In the beta phase, the product is ideally free of all major bugs; the only bugs remaining should be essentially harmless. When the product passes a final quality assurance checklist, it is ready for release to market.

As no one wants software that does not work, testing is an important part of the life cycle and can span several phases. Software testing involves devising a test case (or, more likely, a set of test cases), running the software with the test case as input, and checking that the performance of the software with the test case as input yields the expected results. Software testing can be conducted manually by humans or programmatically, referred to as automated software testing. Ideally, testing of the software should begin as soon as possible in the life cycle of the software. Generally, however, the software cannot be tested at all until the design phase has been completed, because until the design phase is complete, expected results cannot be determined. Typically, during the coding phase, the developer manually tests his code as he writes it. Automated software testing usually cannot begin until far later in the development process.

Sometimes, the only testing that is conducted is done by the developer who manually tests as he codes. A developer who tests his own work, however, is likely to overlook bugs that someone not so emotionally invested in the code will find. Furthermore, the scope of the developer's testing is typically limited to the functionality of his code and integration of his code with a limited number of other software applications.

To address these shortcomings, many software development houses have a separate software testing group that also tests the software, often using at least partially-automated testing techniques. Typically, the testing group tests complex interactions across features and across applications by writing and running test cases. It is generally agreed that involving the testing group early in the product life cycle, even as early as the design phase, reaps many benefits, including identification of inconsistencies in the functional specification, identification of hard-to-test areas and others. In general, however, the effort required to keep each test case current in the face of continued changes in feature definition, implementation and user interface (UI) tuning renders this approach impractical. Hence, writing and running test cases is typically a hurried matter that occurs at the tail end of product development. Testing and in particular, automated testing, thus tends to be perpetually behind the curve. It would be helpful if there were a way to write test cases and employ automated testing as soon as possible in the life cycle of a software product, ideally during the design phase.

Development of a suite of test cases is a challenge whenever it occurs. To test a specific feature of an application, numerous sets of tests must be written. For example, an application may permit many modes of interaction with a feature: via a mouse, keyboard, digitizer, accessibility software, programmatically, and so on. Therefore, to provide a comprehensive test for the feature, a suite of tests should include a set of tests interacting with the feature via the mouse (typing text just like a user might); one set interacting with the feature via keyboard, one set interacting with the feature via digitizer, one set interacting with the feature via accessibility software to invoke default actions and otherwise mimic an accessibility application, one set interacting with the feature via the application's coding model, and so on. It would be helpful if there were a way to make sure that the suite of test cases produced provided a comprehensive test of the feature or application and further, to decrease the total number of test cases that must be written to provide that comprehensive test.

Furthermore, much or all of the logic in each of these sets of test is identical to the logic in the other sets of tests and typically, much or all of the verification of results processing is identical as well. Hence, many tests are identical or very nearly so, merely varying execution options. For example, for all the multiple forms of input described above, the expected results are likely identical. Hence, writing a test case for each of these input sources typically requires writing a separate method for executing the test for each of the input sources, and duplicating most of the rest of the test script. Writing the same test over and over again with minor variations is tedious and time-consuming. It would be helpful if there were a way to eliminate or significantly reduce this duplicative coding and to reduce the total number of test cases that must be written.

Code written to determine if the actual results of running the test case coincide with the expected results (called verification of results, or verification) is often included within the test case. Changing the details of a particular result verification or adding new result verification typically requires the modification of each test case. It would be helpful if verification code were separate from the test case, making the test case easier to understand, and the verification code easier to reuse and to maintain.

Execution details are often hard-coded into the test case, requiring the design phase to be complete before the test case is written. It would be helpful if there were a way to define test cases in terms of user actions rather than in terms of specific execution details so that test cases could be written earlier in the software development life cycle. Testing an application is a crucial step in the initial development of the application. Testing an application is also very important when implementing modifications to the application. Developers, scientists, manufacturers and the like exert much effort in the testing phase. Such testing helps ensure that the application responds in an expected manner to a specific stimulus. The testing is typically completed through execution of test cases and verification of the results of test case execution.

A test case typically imposes a stimulus on an application. A test case should also verify that the application responded in an expected manner and did not respond in an unexpected manner. To be comprehensive, a test should verify much of the entire application state to ensure that the stimulus caused expected results and no unexpected results.

A test case is typically executed for the purpose of testing a specific function or aspect of an application. Likewise, the verification of the results of the test case may focus on the function intended to be tested. The execution of the test case, however, may affect or change other aspects of the application state. Such aspects may seem tangential to the purpose of the test case. These tangential aspects may be numerous, and it may be difficult for the tester developing the test case to quantify or specify all or even most of them.

Writing test case code to verify much of the application state has proved problematic for a variety of reasons. Even for a relatively simple application, a vast number of test cases may be required to comprehensively test the application. Adding lengthy and detailed verification code to each test case would be a daunting if not insurmountable task. Additionally test case maintenance is usually as labor-intensive and time-consuming as (if not more than) test case creation. When an application is altered, the test cases as well as the verification code should be altered to ensure continued compatibility with the application. Adding lengthy, comprehensive verification coding to each test case would make such maintenance impractical if not impossible.

Therefore, there is a need to comprehensively verify results of test cases applied to applications without requiring voluminous, tedious, and time-consuming verification code to be written with each test case. There is also a need for verification that requires minimal explicit actions by the tester to setup, execute, or maintain.

SUMMARY OF THE INVENTION

The verification of test case implementation may be separated from the test cases and may be completed by a dedicated verification manager. The test cases may not need to include any verification and, indeed, the tester need not even know all of the verification that is being performed. The verification manager may be used to verify one or more test cases such that each test case may execute an action without providing for specific verification of the results of the action.

With a dedicated verification manager, verification may be more comprehensive. The verification manager may more comprehensively verify the results of test cases using a large library of expected state generators. Each expected state generator contained in the library may be focused on various separate and different components of an application. One expected state generator may focus on an aspect of the application state that the tester may consider particularly pertinent to the purpose of the test case. A second expected state generator may focus on an aspect of the application that the tester may consider tangential or unrelated to the purpose of the test case. Therefore, instead of having focused verification included in a test case, the library may enable broad verification for all test cases.

The verification manager may verify test case results by comparing expected values of specified application properties against the actual values of those same properties. In doing this comparison, the verification manager will be able to determine instances where the current and expected application states do not substantially align. Finally, the verification manager may communicate any test failures to the test case, the test case executor, or any other designated entity.

The verification process may be completed such that a test case may not even know, for example, that the state of a button on a file menu has been verified when the test case calls for a graphics application to draw a blue rectangle. In gaining this comprehensive verification, no action is required of the tester except to execute the action with appropriate parameters.

Further, maintenance of test cases is minimized or eliminated when the verification is updated or altered. For example, when an application is updated or otherwise altered, the verification manager or expected state generators may likewise require revision to ensure continued conformity with the application. Because the verification may be separated from the test case, the test case may not require any maintenance.

Additionally, when a test case results in a failure of a particular component of an application, further test cases may be executed without continually receiving notification of the same failure. This ability provides an opportunity to take a failure into account and continue testing the application.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In an example embodiment of the invention, the verification process is separated from the test case. Each verification element, called an expected state generator, may be stored in a dedicated device, called a verification manager. By separating each verification process from the individual test cases, each test case may be more comprehensively verified without the necessity of duplicating verification code in each test case. Additionally, the verification manager may comprise numerous expected state generators, each operating independently of the others and each calculating an expected state of one or more components of the application. Verification may be completed offline—that is, at a time other than during test case execution and/or online, or during test execution.

Expected state generators may be embedded in the local verification framework or may be independent objects dynamically loaded, enabled and disabled at runtime. Such expected state generators may be loaded from a database or a network location. In essence, the expected state generators could be plug-ins to the verification framework.

Separating the verification from the individual test cases enables more comprehensive testing of applications. Moreover, having a dedicated verification manager allows test cases to be verified without requiring verification code to be included in each test case. Because verification code is not included in each test case, when verification algorithms are altered to correspond to a modification in an application, such alterations do not affect the test cases. Therefore, separating verification from test cases may reduce the required maintenance on the test cases.

Example Computing Environment

Figure 1:
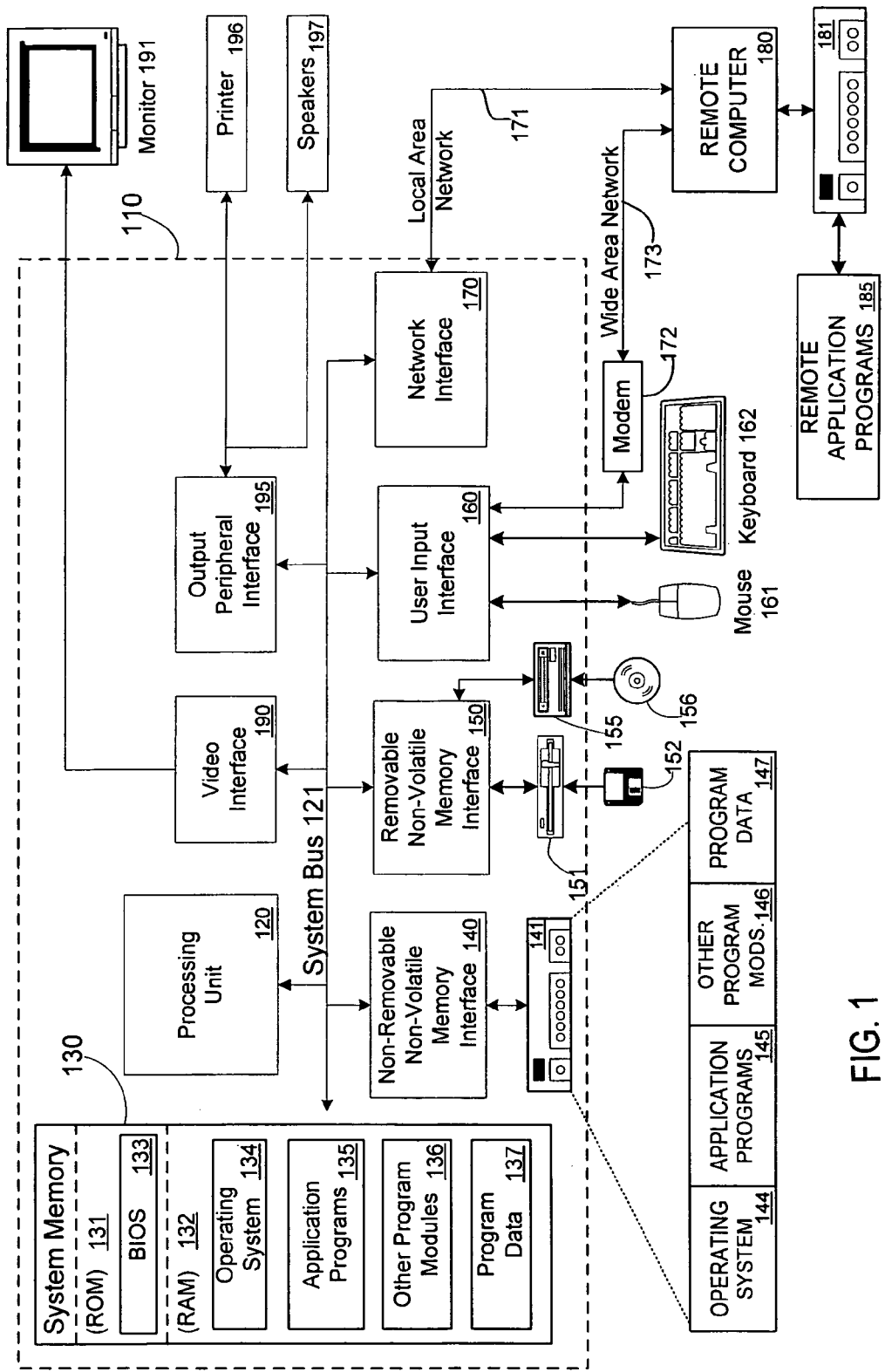
FIG. 1 is a block diagram showing an example computing environment in which aspects of test case verification that is loosely coupled with respect to test case execution may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes volatile and nonvolatile, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Figure 2:
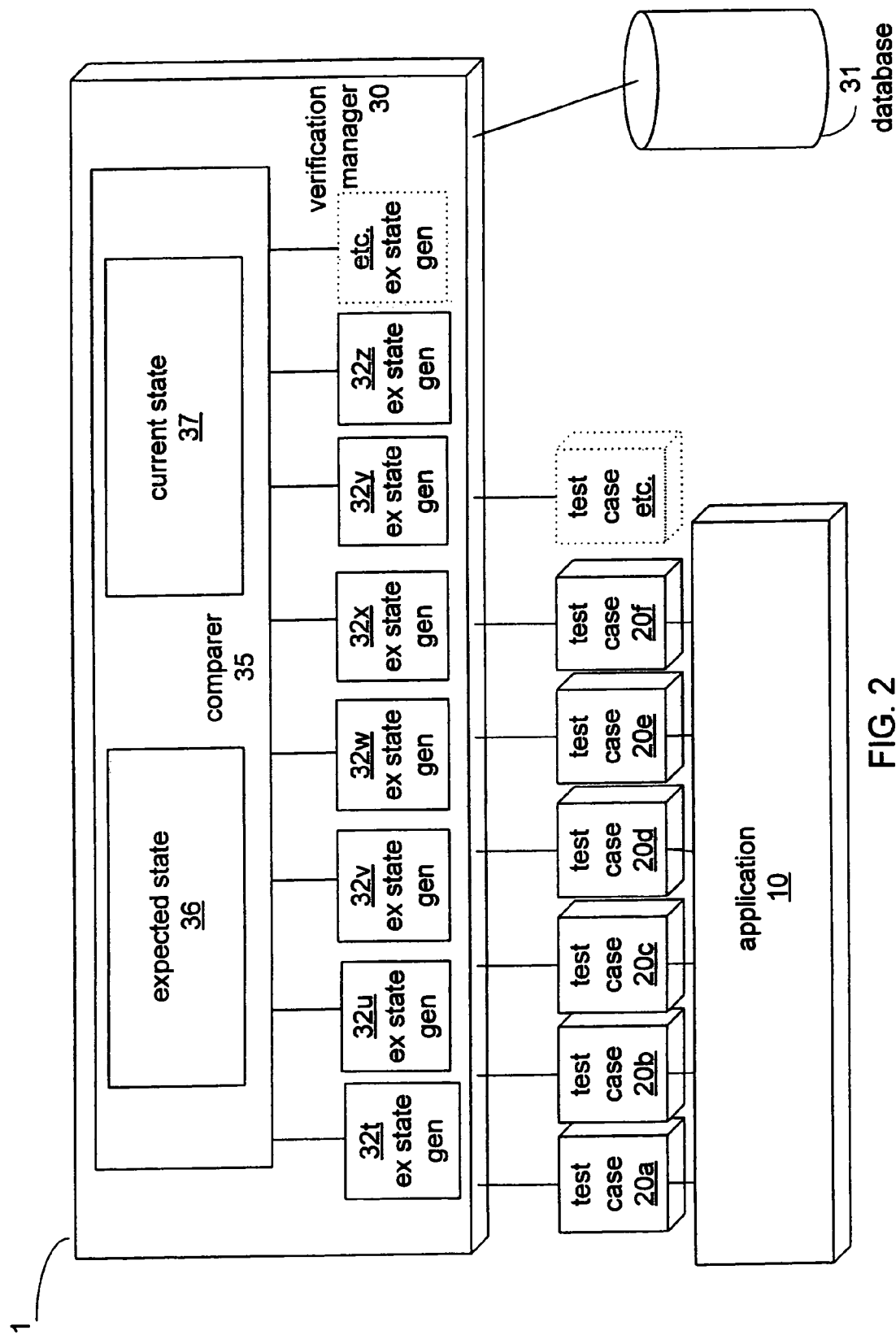
FIG. 2 is a block diagram of a system for test case verification that is loosely coupled with respect to test case execution in accordance with one embodiment of the invention.

System and Method for Test Case Verification that is Loosely Coupled with Respect to Test Case Execution FIG. 2 is a block diagram of a test verifying system 1 for test case verification that is loosely coupled with respect to test case execution in accordance with one embodiment of the invention. The system 1 may reside on a computer which may be a computer 110 as described with regard to FIG. 1. The system 1 may include one or more of the following: a verification manager 30, a test case 20, a comparer 35, an expected application state data structure 36, a current application state data structure 37, and a database 31. The system may include an application 10 to be tested. The application 10 may be any process, machine, manufacture, or composition of matter, or any improvement thereof. The application 10 also may be any program, software, hardware, device, mechanism, or material, or any improvement thereof. For example, the application 10 may be a software program that runs on any computing system. Also for example, the application 10 may be a door testing mechanism where a device hammers on a doorknob to test the strength, resiliency, or operability of the doorknob, a door to which the doorknob is attached, hinges attached to the door, the door frame to which the hinges are attached, and the like. The application 10 may be under development for the first time, an updated version of a previous application, a previously-released application that an end user has modified in some way, and the like.

The application 10 may be tested by one or more test cases, represented in FIG. 2 by test cases 20a, b, c . . . f, etc. The test cases 20a-f may be called for integration or functional testing. Integration testing tests the manner in which two or more interacting components combine, work together, and affect each other. In functional testing, the test case focuses on a specific functional behavior of a test case.

In general, each test case 20a-f includes a well-defined action with well-defined parameters to be applied to the application 10. The test cases 20a-f may each comprise one or more steps to be executed by the application 10. Each of the test cases 20a-f may be one or a series of tests applied to the application 10. Test cases 20a-f may be written in any appropriate programming language such as, for example, C, C#, C++, Pascal, object-oriented languages, and the like. A test case 20a-f or a combination of test cases 20a-f may, for example, call for a graphics application to draw a blue rectangle on a document that contains other shapes of various colors. The test cases 20a-f also may be unrelated to computer programming language. For example, the test case 20a may call for the manual release of a 10 pound maul suspended four feet above and at a 30° angle to a doorknob attached to a door. It will be understood that the graphics application, doorknob application, and any other examples provided throughout this specification in no way limit the claimed scope of the application and instead are only illustrative embodiments described to facilitate understanding.

The test cases 20a-f, shown in FIG. 2 each may test a different aspect of the application 10. It should be understood that the test cases 20a-f merely represent potential test cases, and that there may be any number of test cases 20a-f to test the application 10. Additionally, it should be understood that each of the test cases 20a-f may be executed at the same time or at different times. Additionally, it should be understood that, for example, the test case 20a may be executed once while the test case 20e may be run ten times. Additionally, it should be understood that the test cases 20a-f may be executed by the tester. In an alternative embodiment, the test cases may be executed by a test case executor or similar device.

In one example embodiment of the invention, the test cases 20a-f may be in direct communication with a verification manager 30. In an alternative embodiment of the invention, the test cases 20a-f may call other subroutines that communicate with the verification manager 30. The test cases 20a-f may not know how verification is completed. For example, if many test cases 20a-f need a blue rectangle, a subroutine may be written that draws a blue rectangle. This subroutine could communicate with the verification manager 30. The test cases 20a-f using this subroutine would know that the subroutine draws a blue rectangle but would not necessarily know the subroutine is communicating with the verification manager 30.

The verification manager 30 may include expected state generators 32t-z, a comparer 35, and expected application state and current application state data structures 36, 37. An expected state generator such as each of the expected state generators 32t, u . . . z, etc., may be associated with one or more particular components, data points, or properties. For example, with regard to testing a graphics application in which one, some, or all of the test cases 20a-f call for the application 10 to draw a blue rectangle in a certain position, the expected state generators 32t-z may focus on different components of the application state. The expected state generator 32t may focus on the color of the rectangle. The expected state generator 32u may focus on the position of the rectangle. The expected state generator 32v may focus on less obvious results from the running of the test cases 20a-f, such as the location of a triangle on the same document as the newly drawn blue rectangle. Alternatively, the expected state generators 32u, 32v may be combined in or replaced by a single expected state generator (not shown) concerned with the location of every shape on the document. The expected state generator 32w may focus on the status of an unrelated option on the toolbar, such as an option to open a new document.

Also for example, if the test cases 20a-f individually or collectively test a doorknob attached to a door by hitting the doorknob with a maul, then the expected state generator 32t may focus on the ability of the doorknob to turn. The expected state generators 32u and 32v may focus on an upper and lower hinge attached to the door, or may be combined in or replaced by a single expected state generator (not shown) concerned with the state of the hinge. Expected state generator 32w may focus on the wood portion of the door surrounding the doorknob. Other expected state generators may focus on other areas of the application 10.

All of the expected state generators 32t-z may be called when one or more test cases 20a-f are applied to the application 10 or only one or some of the expected state generators 32t-z may be called. In one example embodiment, the expected state generators 32t-z may run independent of and therefore be loosely coupled with the test cases 20a-f. In this way, the test cases 20a-f need not specify to the verification manager which expected state generators 32t-z should be called during application of the test cases 20a-f. The test cases 20a-f, then, may not contain verification mechanisms. Indeed, the test case 20a-f may not be aware that any verification is to occur. The verification manager 30 may be responsible for verifying the results of the test case 20a-f and the purpose of the test cases 20a-f may be limited to applying a stimulus with specific parameters to the application 10.

Those skilled in the art will recognize, however, that a test case may, consistent with an example embodiment, contain verification coding. This may be the case particularly if the purpose of running a test case 20a-f is to determine if a specific problem has been rectified. In an alternative embodiment, the test case 20a-f could also specify one or more expected state generators 32t-z to be called and specify that certain other expected state generators 32t-z should not be used.

With the separation of verification from the test case 20a-f, the verification may be more comprehensive for a test case 20a-f. The verification manager 30 may include expected state generators 32t-z that previously may have been a part of individual test cases. For example, the verification manager 30 may contain the expected state generators 32t-z of prior art test cases 20a-f designed to test a graphic application's ability to draw a blue square, a red circle, a yellow triangle, or an ellipse, to use an option on a pull-down menu, to respond to various user inputs through use of a mouse or the keyboard, and the like. Each of these test cases would have included specific verification focused on the purpose of the actions of the test case. With a dedicated verification manager 30 containing the expected state generators 32, a test case 20a-f for drawing a blue rectangle in a graphics application can be more comprehensively verified. The verification manager 30 can call on the expected state generators 32 that are specific to the blue rectangle, a red square, a yellow triangle, a pull-down menu, inputs by mouse and by keyboard, and the like. In this way, a test case 20a-f that calls for drawing the blue rectangle may invoke expected state generators 32t-z to check the obvious and not-so obvious effects of the test case 20a-f on the application 10. The tester may not even know, for example, that the red circle is being verified when the blue rectangle is drawn. If the test results are such that the red circle remained unaffected by the test case 20a-f and if this was an expected result, then the tester and/or test case may not know that the red circle was verified. If however, the red circle unexpectedly moved slightly, then the verification manager 30 could alert the tester that an unexpected result occurred.

Likewise, if the test case 20a-f involves hitting a doorknob attached to a door with a maul, then the verification process may include determining not only the effects of the test on the doorknob, but also on the door, door frame, hinges, and so forth.

Additionally, the verification of test cases 20a-f may remain largely unaffected if the application 10 is changed, updated, and the like. New versions of the application 10 may be created which could alter the way the application 10 works. The test case 20, accordingly, may need to change. For example, a test case 20a-f for testing a graphics application may require revision in how it calls for the drawing of a blue rectangle. Also for example, the test case 20a-f for testing a doorknob attached to a door may need to change the weight and height of a maul if a new doorknob to be tested has greater resiliency than previous versions. The expected state generators 32, however, each may not need to be altered. In the graphics application example, the expected state generators 32 may continue to check the location of a new blue square, and an existing red circle, yellow triangle, and ellipse in the same manner as before the application 10 was altered. Likewise, the expected state generators 32 may verify the doorknob, the door, the hinges, and the doorframe in the same manner as before the new doorknob was added and the test case 10 modified.

The expected state generators 32t-z may communicate via the verification manager 30 with a database 31. The database 31 may provide information to the expected state generators 32 so that the expected state generators may better be able to determine an expected state of the application 10 from the test case 20. For example, the test case 20a-f may involve hitting a door knob attached to a door with a maul. The expected state generator 32a may determine the effect of the test case on a ⅛ inch thick, 2-inch long brass hinge also attached to the door. In doing so, the expected state generator 32a may query database 31 to retrieve information regarding, for example, the tensile strength of brass. In an alternative embodiment, each expected state generator 32 may be in communication with one or more databases 31 independent of the verification manager 30. Alternatively, each expected state generator 32 may retrieve or receive information from a pluggable component.

Expected state generators 32t-z may be in communication with a comparer 35. As shown in FIG. 2, the comparer 35 may be part of the verification manager 30. However, those skilled in the art will recognize that comparer 35 may be located outside the verification manager. In this case, the comparer may be in communication with the verification manager 30 and/or with the expected state generators 32. The comparer 35 may compare an expected state data structure 36 with an actual state data structure 37.

More specifically, when one or more test cases 20a-f are about to be executed, the test cases 20a-f or a test executor may notify the verification manager 30. The verification manager 30 may take a snapshot of the present global state of the application. That is, the verification manager may make a copy in memory of the present values of the properties of the application. The verification manager 30 then may notify the expected state generators 32 of the pending test cases 20 to be run. In an example embodiment, only those expected state generators 32 that may be implicated in the test case 20a-f may be notified. In an alternative embodiment, all of the expected state generators 32 may be notified.

Based on the action and parameters of the action about to be executed and the verification manager's snapshot of the present global state, each expected state generator 32 calculates its expected outcome state with regard to a component of the application from the prospective execution of the test cases 20a-f on the application 10. For example, if the application 10 is a graphics application, and the test cases 20a-f collectively require the drawing of a blue rectangle, then each expected state generator 32 determines its expected application state with regard to this action. The expected state generator 32t may determine that the outcome should include a rectangle. The expected state generator 32u may determine that the rectangle should be blue. The expected state generator 32v may be focused on a red circle away from the rectangle and may determine that its expected state should remain unchanged by the test case 20. Each expected state generator communicates this expected component state to the verification manager 30, and the verification manager 30 may place the data in an expected application state data structure 36 in the comparer 35. In this way, the verification manager 30 may have a global expected application state prior to the execution of the test cases 20a-f. Additionally, this means that the global expected application state may be determined at any time or on demand. Expected results from execution of a test case 20a-f may be deterministic. Alternatively expected results may be non-deterministic if the expected state generators 32t-z understand that non-deterministic results are acceptable.

Upon completion of the test case 20, the verification manager 30 may take another snapshot or make a copy in memory of the current values of the properties of the application. This snapshot may show the application's current global state. The current value of the properties may be stored in a current application state data structure 37. The comparer 35 then compares the expected application state data structure 36 with the current application state data structure 37. Any discrepancies indicate areas where further attention may be warranted. In an alternative embodiment, the data structures 35, 36 may be sent to an appropriate vehicle for performing the comparison. For example, the comparison may be completed through the use of extensible markup language (XML).

Discrepancies between the expected and current application state data structures 36, 37 may alert the tester and result in alternative conclusions. Discrepancies between the expected and current application state may indicate areas where the application 10 is not acting in an appropriate manner. In such cases for example, debugging of source code or changing the structure of a material may be required. That is, for example, if the test case 20a-f was intended to result in the drawing of a blue square and instead the test case 20a-f resulted in a red square being drawn, then the tester may be inclined to fix the application 10 and run the test case 20a-f again. If the tester is not the person developing the application, then the tester may notify the developer of the incorrect behavior—the red square—by logging a bug in a bug-tracking system, sending an email, walking over to the developer's office, or using some other notification system. Also for example, if the test case 20a-f was intended to result in a doorknob that continued to operate, but instead a maul that hit the doorknob knocked the doorknob off the door, then the tester may be inclined to use stronger fasteners to hold the doorknob to the door. Alternatively, if the tester is not also manufacturing the door, then the tester may recommend to the door manufacturer that stronger fasteners be used.

Discrepancies may also indicate that the expected application state of an expected state generator 32 was unrealistic. In such a case, an alteration to the expected state generator 32 may be warranted. For example, the application 10 to be tested may be a graphics application. One or more test cases 20a-f may include drawing a rectangle using a mouse. One or more expected state generators 32 then may expect a perfect rectangle to be drawn. If drawing a perfect rectangle with a mouse is not a realistic possibility in the application 10, the comparer 30 may indicate that the test failed because of imperfection in the resultant rectangle. The tester may then add a tolerance into the applicable expected state generators 32 to allow for an expected application state comprising an essentially rectangular but not quite perfect rectangle.

In an example embodiment, the expected state generators 32 may determine expected state based not only on the actions and parameters called for in the test case 20a-f but also on the current application state. This enables the verification manager 30 to take into account previous test case failures and determine expected state based on those failures. For example, a test case 20a-f may involve hitting a doorknob attached to a door with a maul. If in executing the test case, a hinge attached to the door is damaged, the verification of the hinge for future test cases 20a-f may not indicate a failure based on the previous damage. Instead, the verification manager 30 may determine the expected state of the hinge, taking into account the previous damage.

Figure 3A:
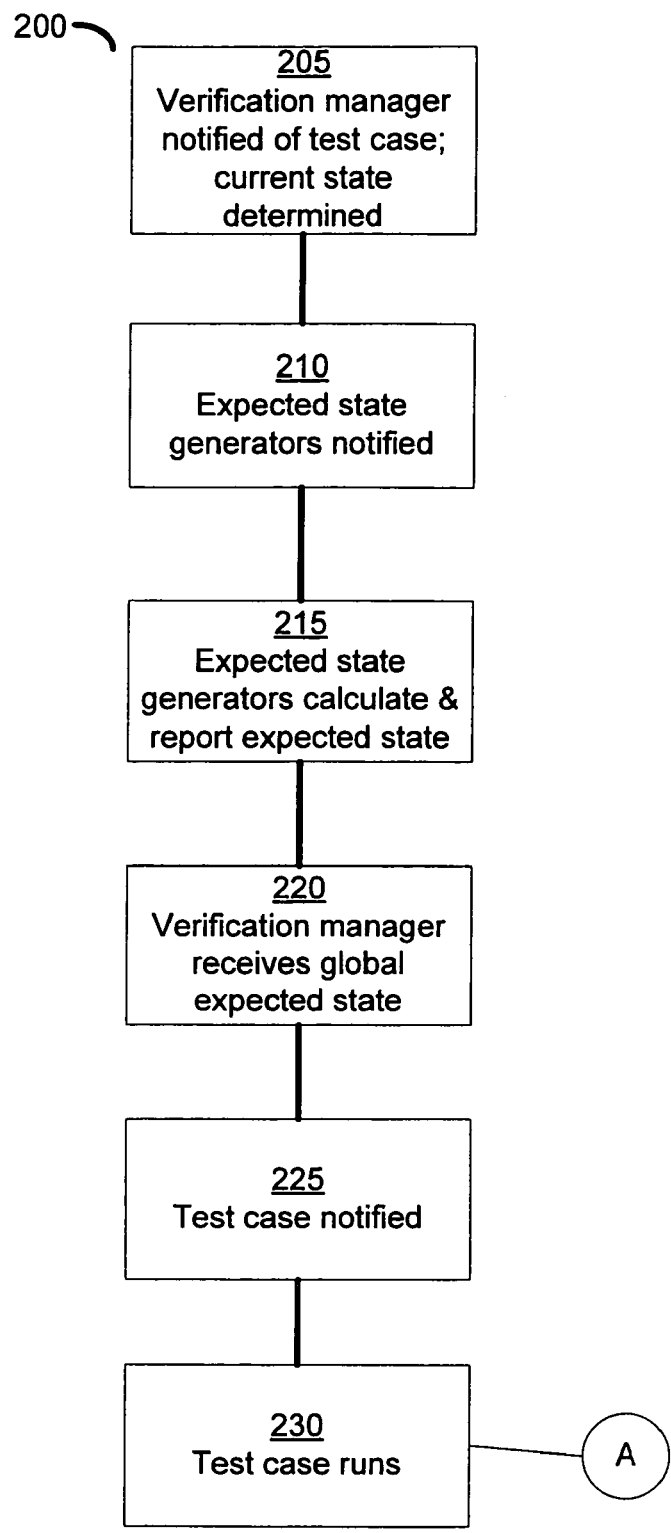
FIGS. 3A-B are flow diagrams of a method for test case verification that is loosely coupled with respect to test case execution in accordance with one embodiment of the invention.

FIG. 3A depicts a flow diagram of an example method of performing loosely-coupled verification. A verification method 200 may begin at step 205 with a test case 20a-f. In an alternative embodiment, a test case executor may send a start event to the verification manager or call the verification manager 30. From this start event or call, the verification manager 30 may be notified of the pending test case 20. The test case 20a-f may include well-defined actions that will be imposed on application 20a-f including parameters of the action. Upon notification, the verification manager 30 may take a snapshot of the present global state. At step 210, the verification manager 30 may determine which expected state generators 32 may be implicated in the pending test case 20a-f and notify the applicable expected state generators 32. Alternatively, the verification manager 30 may notify all of the expected state generators 32 of the pending test case 20a-f. At step 215, the expected state generators 32 will review applicable actions and parameters of the test case 20a-f. Based on the present value of the properties of its component or components, the expected state generators may calculate the expected component state expected upon completion of the test case 20. Each notified expected state generator 32 may then send its expected component state to the verification manager 30. This data may be stored in the expected application state data structure 36 of comparer 35. When all of the applicable expected state generators 32 have reported with expected component state data, the verification manager 30 will have (at step 220) global expected application state. The verification manager 30 then may, at step 225, notify the test case 20a-f or a test executor, that the test case 20 can be executed. Control is thus given back to the test case 20a-f (or test executor). At step 230, the test case 20a-f may be executed.

Figure 3B:
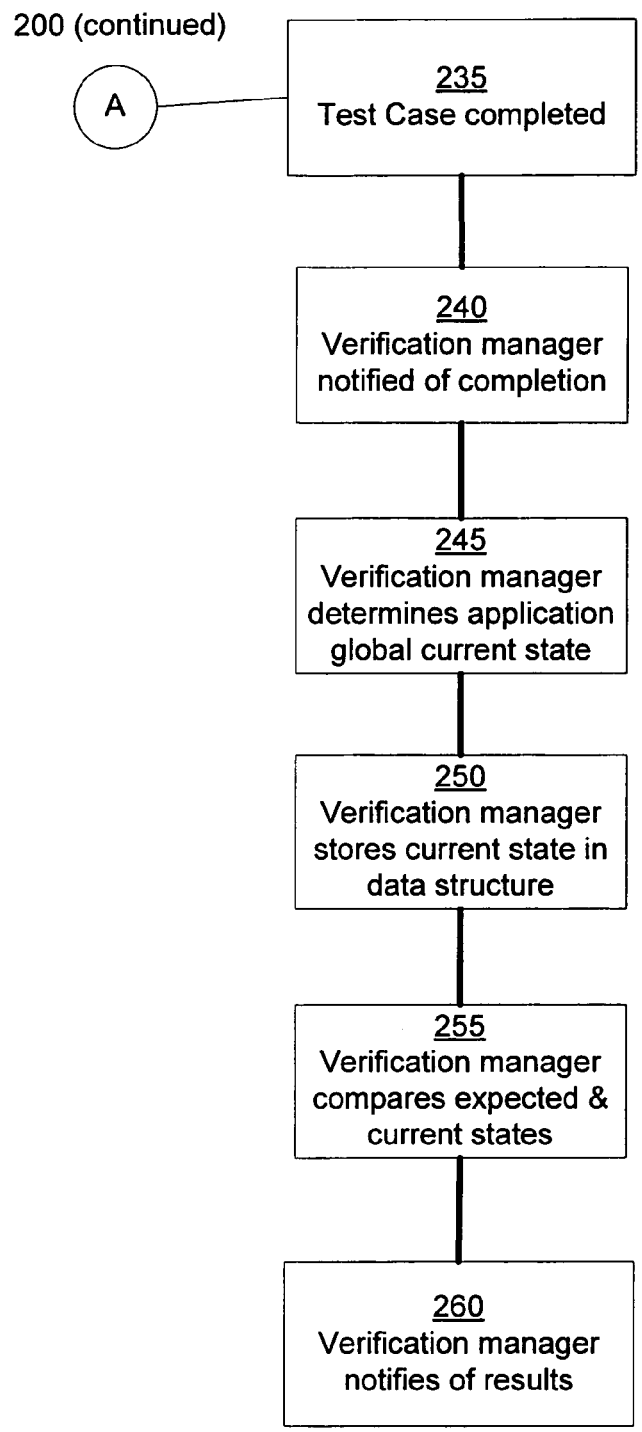

FIG. 3B continues the flow diagram of FIG. 3A. At step 235, the test case 20a-f may be executed, updating the global snapshot. Upon completion of the test case 20, the verification manager 30 at step 240 may be notified that the test case 20a-f has been completed. At step 245, the verification manager 30 may take a snapshot of the current application state. This snapshot may reflect the actual results of the test case on the application. This snapshot may also represent the value of the properties of the application. The verification manager 30 may store the snapshot in the current application state data structure 37 at step 250. The verification manager 30, at step 255, then may compare the expected and current application state data, and, at step 260, report the results of the entire comparison or any results where the expected and current values of properties are not substantially the same. In an alternative embodiment of the invention, the snapshots of expected and current state may be completed during the running of a test case. That is, all or some of steps 210 through 260 may be executed multiple times within a test case.

The comparison of the expected and current state data structures 36, 37 may be completed within the verification manager 30. Alternatively, the data structures may be serialized out to extensible Markup Language (XML) so that the comparison may be completed with XML. In such cases, the XML may compare the data structures 36, 37 and send the results to the verification manager 30, the test case 20, or the test executor. In an alternative embodiment of the invention, the comparer 35 may be decoupled from the test case execution process. This decoupling may enable the comparison between the expected and current application states to be completed at a time unrelated to test case execution. In such event, the expected and current state data may be saved to a database or other data store, or saved in a computer memory.

In an example embodiment of the invention, the verification manager 30 may make notification of the results of the individual verification results, or may make notification in only those instances in which the expected and current application states data differ (i.e., when there has been a failure). The notification may take place some time after the test case has finished executing, and may come through an avenue completely unrelated to the test case. For example, the comparer 35 could e-mail verification results to a designated contact.

It should be recognized that, if the same test case 20a-f is executed again or if a different test case 20a-f is executed, all of the steps of the method 200 shown in FIGS. 3A-3B may not be required. For example, the verification manager 30 may contain in the comparer 35 the expected state data structure for the pending test case 20. If so, then the verification manager 30 may not need to obtain expected component state data from the expected state generators 32 prior to the test case 20a-f being executed. Therefore, not all steps of method 200 need be completed each time a test case 20a-f is executed.

Figure 4:
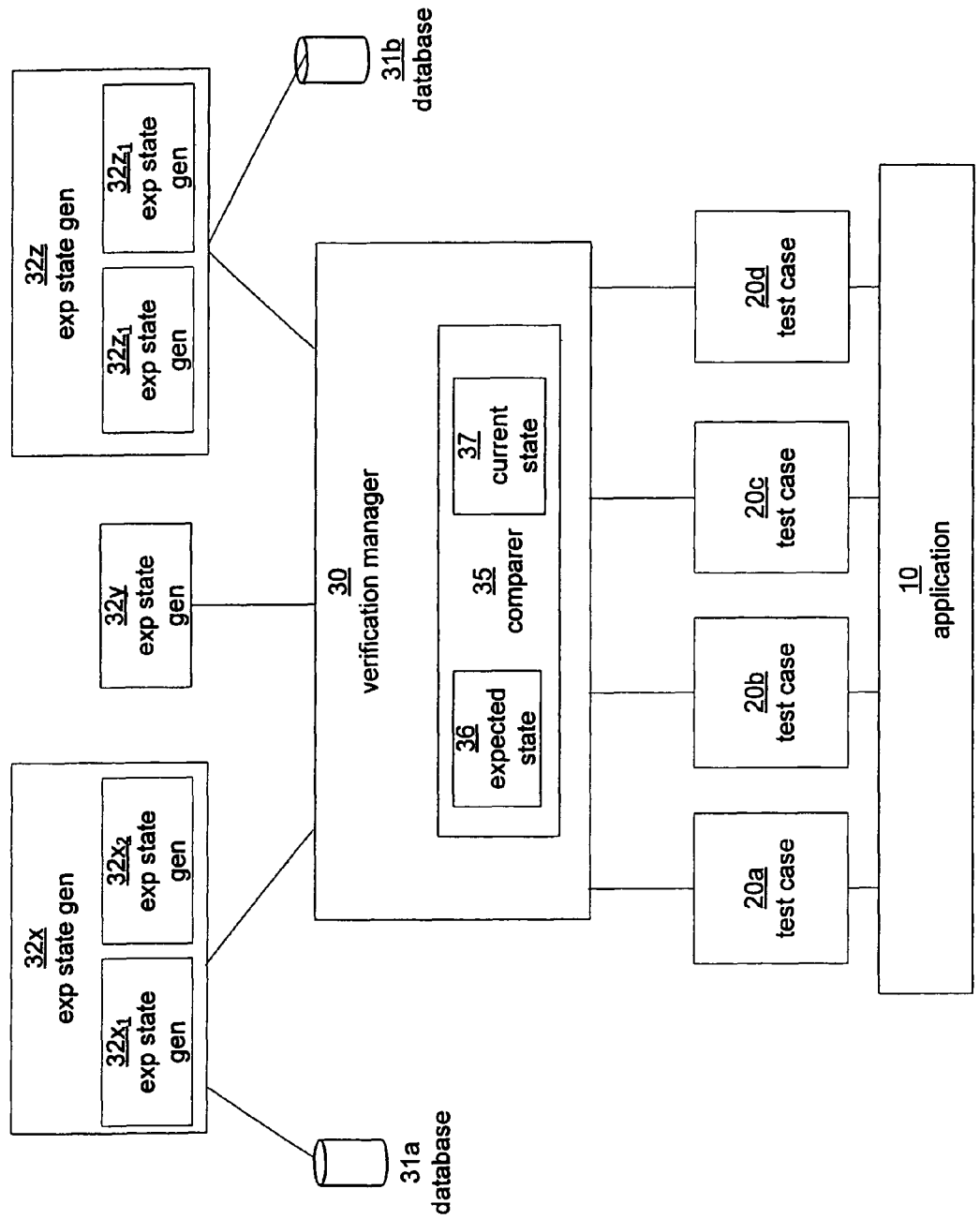
FIG. 4 is a block diagram of a system for test case verification that is loosely coupled with respect to test case execution in accordance with an alternative embodiment of the invention.

FIG. 4 is a block diagram of an example system for test case verification that is loosely coupled with respect to test case execution in accordance with an alternative embodiment of the invention. In this alternative embodiment, one or more test cases 20a-f may be applied to an application 10. As explained above, a test case 20a-f may be an integration test case or a functional test case. In general, each test case 20a-f has a well-defined stimulus with well-defined parameters to be applied to the application 10. The test cases 20a-f may each comprise a step or numerous steps to be executed by the application 10. Each of the test cases 20a-f may be one or a series of tests on which the application 10 acts. The verification manager 30 may comprise a comparer 35 with expected and current application state data structures 36, 37. As explained above, it should be recognized that comparer 35 may be separate from and in communication with the verification manager 30. Additionally the expected state generators 32x-z may be separate from verification manager 30. The expected state generators 32 may be in communication with verification manager 30. The function of the expected state generators 32 and the verification manager 30 may be similar or identical to those explained with regard to FIG. 2. The component on which each expected state generator $32t$-$z$ may be focused may be a data point within the application 10. The data point may be a value of a property, and therefore each expected state generator $32t$-$z$ may supply the verification manager 30 with an expected property value prior to test case execution. Additionally, the expected state generators 32 may comprise other expected state generators 32. The expected state generators 32 may be in communication with the verification manager 30. Moreover, the expected state generators 32 may be in communication with one or more databases 31a-b, which may be pluggable components.

For example, if a test case 20a-f involves hitting a doorknob attached to a door with a maul, an expected state generator $32x$ may determine the expected state of a hinge that is attached to the door. In doing so, the expected state generator $32x$ may call on an expected state generator $32x_1$ to report on a lower portion of the hinge. Likewise, the expected state generator 32x may call on an expected state generator $32x_2$ to report on an upper portion of the hinge. The expected state generator 32x may combine the data in determining expected state, and communicate the combined data, at the appropriate times, to the verification manager 30. Additionally, if the expected state generator 32x is to determine the effect of the test on an 1/8 inch thick, 2-inch long brass hinge attached to the door, the expected state generator 32x may query database 31a to retrieve information regarding, for example, the tensile strength of brass.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other embodiments may be used or modifications and additions may be made to the described embodiments for performing the same function of the present invention without deviating therefrom. Throughout the specification, two primary examples were provided, one dealing with a hypothetical graphics application and the other with a doorknob attached to a door. These specific examples were provided to enhance understanding. In no way is the present invention limited to a graphics application or an application involving a doorknob attached to a door. Moreover, present invention may be included in any test involving any application involving any process, machine, manufacture, composition of matter, program, software, hardware, device, mechanism, or material, or any improvement thereof. Therefore, the present invention should not be limited to any single embodiment, but rather should be construed in breadth and scope in accordance with the appended claims.

What is claimed is:

1. A system for verifying a plurality of results of an action applied to an application according to a test case, the system comprising:
    a plurality of expected state generators operating independent of one another and independent of the test case for calculating a plurality of expected results of applying the action to the application and for updating a plurality of expected application states; and
    a verification manager for maintaining a plurality of current application states resulting from the applied action and comparing the plurality of expected application states with the plurality of current application states, wherein verification of the plurality of expected application states is separated from the test case.

2. The system of claim 1, wherein the plurality of expected state generators determines the plurality of expected application states prior to execution of the action.

3. The system of claim 1, wherein the plurality of expected state generators determines the plurality of expected application states on demand.

4. The system of claim 1, further comprising a plurality of expected state generators for communicating to the verification manager a plurality of expected component states for a plurality of components of the application.

5. The system of claim 4, wherein the plurality of expected state generators are external to the verification manager.

6. The system of claim 4, further comprising at least one component database in communication with the plurality of expected state generators, wherein the at least one component database facilitates the plurality of expected state generators in determining the plurality of expected component states of the plurality of components.

7. The system of claim 1, further comprising a test case in communication with and independent of the verification manager for executing the action.

8. The system of claim 1, wherein the action comprises:
    a stimulus; and
    a parameter.

9. The system of claim 1, wherein the action is at least one of a functional test and an integration test.

10. The system of claim 1, further comprising an expected application state data structure and a current application state data structure.

11. The system of claim 10, wherein the expected application state data structure comprises information received from the plurality of expected state generators.

12. The system of claim 10, wherein the current application state data structure comprises information received from the verification manager.

13. The system of claim 1, wherein the verification manager compares the plurality of expected application states with the plurality of current application states offline.

14. The system of claim 1, wherein the verification manager compares the plurality of expected application states with the plurality of current application states online.

15. The system of claim 1, wherein each of the plurality of expected state generators are loaded from at least one of a database and a network location.

16. The system of claim 1, wherein the verification manager provides a notification of the comparison of the plurality of expected application states with the plurality of current application states.

17. The system of claim 16, wherein the notification is completed offline.

18. A computer-readable storage medium having stored thereon a data structure, comprising:
    a first data field stored in a verification manager containing data representing a plurality of expected application states of an application based on an action to be implemented on the application; and
    a second data field stored in the verification manager containing data representing a plurality of current application states of the application resulting from applying the action, wherein the action is defined and applied by a test case that is independent of the verification manager and the plurality of expected application states are calculated by a plurality of expected state generators independent of one another and independent of the test case such that verification of the plurality of expected application states is separated from the test case.

19. The computer-readable medium of claim 18, wherein the plurality of expected application states and plurality of current application states pertain to states of components of the application.

20. A method for verifying results of an action applied to an application according to a test case, comprising:
    saving a plurality of current application states of the application;
    calculating a plurality of expected application states from an action to be applied to the application according to a test case;
    saving the plurality of expected application states;
    executing the action;
    updating the plurality of current application states of the application resulting from executing the action; and
    comparing the plurality of expected application states of the application and the plurality of current application states of the application,
    wherein the plurality of expected application states are calculated by a plurality of expected state generators operating independent of one another and independent of the test case and wherein verification of the plurality of expected application states is separated from the test case.

21. The method of claim 20, further comprising creating a copy of the plurality of initial current states.

22. The method of claim 20, further comprising receiving a plurality of expected component states for a plurality of components of the application.

23. The method of claim 22, wherein the plurality of expected component states are stored in an expected application state data structure.

24. The method of claim 22, wherein the plurality of current application states are determined by a verification manager.

25. The method of claim 24, wherein the plurality of expected state generators are located external to the verification manager.

26. The method of claim 20, further comprising:
    notifying the test case if the plurality of expected application states and plurality of current application states are not substantially equal.

27. The method of claim 20, wherein the comparing step is completed using XML.

28. The method of claim 20, wherein the step of saving a plurality of current application states of the application is completed after the action is applied.

29. The method of claim 20, wherein the step of saving the plurality of expected application states is completed before the action is executed.

30. A computer-readable storage medium having computer-executable instructions for performing steps comprising:
    calculating a plurality of expected application states from an action to be applied to the application according to a test case;
    executing the action;
    determining a plurality of current application states of the application resulting from executing the action; and
    comparing the plurality of expected application states of the application to the plurality of current application state of the application,
    wherein the plurality of expected application states are calculated by a plurality of expected state generators operating independent of one another and independent of the test case and wherein verification of the plurality of expected application states is separated from the test case.

31. The computer-readable medium of claim 30, having further computer-executable instructions for performing the step of receiving a plurality of expected component states for a plurality of components of the application.

32. The computer-readable medium of claim 31, having further computer-executable instructions for performing the step of storing the plurality of expected component states in an expected application state data structure.

33. The computer-readable medium of claim 31, having further computer-executable instructions for performing the step of providing notification if the plurality of expected application states are not substantially equal to the plurality of current application states.

* * * * *